United States Patent [19]
Virkki et al.

[11] Patent Number: 5,858,424
[45] Date of Patent: Jan. 12, 1999

[54] USE OF AN ORGANIC ACIDS CONTAINING FRACTION FOR PRESERVING FORAGE

[75] Inventors: Markku Virkki, Espoo; Juha Apajalahti; Erkki Virtanen, both of Helsinki; Hannu Paananen, Kantvik; Kaj-Erik Montén, Lapinkylä, all of Finland

[73] Assignees: Cultor Oy, Helsinki; Sareko Agro Oy, Turku, both of Finland

[21] Appl. No.: 765,494

[22] PCT Filed: Jun. 7, 1995

[86] PCT No.: PCT/FI95/00330

§ 371 Date: Feb. 18, 1997

§ 102(e) Date: Feb. 18, 1997

[87] PCT Pub. No.: WO96/00507

PCT Pub. Date: Jan. 11, 1996

[30] Foreign Application Priority Data

Jun. 28, 1994 [FI] Finland ..................................... 943108

[51] Int. Cl.⁶ ............................... A23B 4/12; A23K 1/02; A23K 3/03
[52] U.S. Cl. ................................ 426/54; 426/52; 426/53; 426/321
[58] Field of Search .................................. 426/54, 52, 53, 426/321, 807

[56] References Cited

U.S. PATENT DOCUMENTS

| | | | |
|---|---|---|---|
| 4,273,659 | 6/1981 | Robertiello et al. | 210/728 |
| 4,292,331 | 9/1981 | Ostre | 426/52 |
| 4,772,481 | 9/1988 | Rohwer et al. | 426/335 |
| 5,177,008 | 1/1993 | Kampen | 435/139 |
| 5,369,122 | 11/1994 | Steinmetzer | 514/423 |

FOREIGN PATENT DOCUMENTS

| | | |
|---|---|---|
| 0 422 569 A1 | 4/1991 | European Pat. Off. . |
| 422569 | 4/1991 | European Pat. Off. . |
| 0 505 596 A1 | 9/1992 | European Pat. Off. . |
| 0 588 267 A2 | 3/1994 | European Pat. Off. . |
| 1662474 | 7/1991 | U.S.S.R. . |
| 2 187 631 | 9/1987 | United Kingdom . |
| WO90/11693 A1 | 10/1990 | WIPO . |

OTHER PUBLICATIONS

Derwant's abstract, No. 92–130351/16, Jul. 15, 1991.

Das wirtschaftseigene Futter, vol. 27, No. 1, 1981, F. Gross, pp. 27–38.

CAB 900395254, Sugar Industry Abs, Alexandria Journal of Agricultural Research, vol. 32, No. 3, 1987, pp. 49–61.

*Primary Examiner*—Chhaya D. Sayala
*Attorney, Agent, or Firm*—Scully, Scott, Murphy & Presser

[57] ABSTRACT

The invention relates to the use of an organic acids containing fraction obtained from vinasses and molasses for preserving forage, stimulating microbial growth and activity, and enhancing forage utilization. The fraction may be used as such, or mixed with forage, or used together with a microbe that resists the acidity of the fraction and produces acid.

10 Claims, No Drawings

USE OF AN ORGANIC ACIDS CONTAINING FRACTION FOR PRESERVING FORAGE

The invention relates to the use of an organic acids containing fraction obtained from vinasses and molasses for preserving forage, stimulating microbial growth and activity, and enhancing forage utilization. The fraction contains e.g. various organic acids and also other substances stimulating microbial growth and fermentation, and it is useful e.g. in the preservation of forage, stimulation of microbial growth, stimulation of rumen fermentation, and stimulation of forage intake e.g. in ruminants. The fraction can be used as such, or mixed with forage, or used together with a microbe that resists the acidity of the fraction and produces acid.

BACKGROUND

Proper preservation of forage is vital to both animal nutrition and performance. In the generally used AIV method, the forage pH is lowered to about 4, which inhibits microbial activity, and reduces dry matter and protein losses in the forage. The pH was earlier lowered by strong inorganic acids, but now the dominant acid used for preservation is formic acid. Strong acids are effective in inhibiting microbial growth in forage, but in the rumen this property is less advantageous. Further, if the acid does not succeed in inhibiting microbial growth completely, there is a risk that the most harmful microbial species may colonize the silage due to lack of competition.

Several salts and products of microbial or plant origin have been used for enhancing the effect of strong acids or for replacing the acids as preservatives (Bolsen, K. & Heidker, J. I., 1985, Silage Additives USA, Chalcombe Publications, UK). These additives have often been used for enhancing the growth of beneficial bacteria, such as lactic acid bacteria, and thereby for inhibiting the growth of harmful microbes, such as yeasts, molds, clostridia and coliforms. The use of lactic acid bacteria is often limited by the lack of carbohydrates suitable for the growth of these bacteria.

By-products of sugar processing, molasses, and their fermentation by-products, vinasses, are known as silage additives and additives of ruminant feed (Bolsen, K. & Heidker, J. I., 1985; Haaksma, J., 1987, The influence on growth, energy efficiency and dressing percentage, when in ratios for beef cattle containing pressed pulp soy bean meal protein was replaced by protein from vinasse or NPN, Mededeling, Instituut voor Rationele Suikerproduktie, no. 15, 23 pp.; Herold, I., Takacs, F., Beri, B. & Kota, M., 1987, Influence of chemical and biological conservation agents on silage made from green fodder with a high protein content). Due to their high nitrogen content, these products have efficiently increased the silage protein value. The molasses and vinasses, however, are not sufficiently acidic to be able to significantly lower the forage pH. Nutritionally, their high potassium content may cause problems in respect of reduced magnesium absorption (Tomas, F. M. & Potter, B. J., 1976,: The effect and site of action of potassium upon magnesium absorption in sheep, Aust. J. Agric. Res. 27, 873–880; Fontenot, J. P., Allen, V. G., Bunge, G. E. and Goff, J. P., 1989, Factors influencing magnesium absorption and metabolism in ruminants, Journal of American Science 67, 3445–3455).

BRIEF DESCRIPTION OF THE INVENTION

In the present invention, a new product has been successfully developed from vinasses and molasses. The product has a low potassium content and is, because of its high organic acid content, acidic.

The invention relates to the use of this organic acids containing fraction (Bioacid) from vinasses and molasses for preserving forage, enhancing forage and feed utilization by the animal, and for stimulating microbial growth and activity, especially rumen fermentation.

The fraction is obtained from vinasses and molasses through potassium precipitation and, optionally, by chromatographic separation processes, in which most of the potassium is removed from the starting materials. With the optionally removed betaine fraction, other substances, such as glycerol and monosaccharides, are also removed.

The organic acids containing fraction is thus produced from organic materials of plant origin, and its composition varies greatly, depending on the processing and the raw material. The fraction primarily comprises organic acids, such as lactic acid, acetic acid and pyrrolidone carboxylic acid (PCA), whose proportion in the dry matter is about 18 to 45%. The fraction also comprises a relatively large quantity of nitrogenous substances: the fraction has a total nitrogen content of about 3 to 12% and amino acid content of about 1 to 10%. The total carbohydrate content is about 5 to 35%. The proportion of ash in the dry matter is about 12 to 30%. Depending on the processing, the betaine content varies from about 1 to 20%.

The organic acids containing fraction is effective in the preservation of forage, stimulation of microbes, especially stimulation of rumen fermentation, and stimulation of forage intake in ruminants. When the fraction is used for stimulating rumen fermentation and forage intake in ruminants, it can be added to either forage or silage. To enhance fermentation, the fraction can also be used as such, as an additive of ruminant feed.

The organic acids containing fraction can also be used in forage preservation simultaneously with a microbe that resists the acidity of the fraction and produces acid. The microbes can be either added separately or used in combination with the fraction. Microbes of this kind have been observed to operate synergistically with the fraction. This naturally also means that when the fraction is used with suitable microbes, the quantity of the fraction can be reduced significantly.

The organic acids containing fraction in combination with the microbe that resists the acidity of the fraction and produces acid are effective in forage preservation, stimulation of rumen fermentation, and stimulation of forage intake of ruminants. When used for stimulating rumen fermentation and forage intake in ruminants, they can be added to either forage or silage. To enhance fermentation, they can also be used as such, in combination, or administered separately as additives of ruminant feed.

DETAILED DESCRIPTION OF THE INVENTION

Preparation of an organic acids containing fraction

Molasses and different sugar-containing extracts of plant origin, such as starch hydrolysates and sugar juice obtained from sugar cane and sugar beets, are used as raw material in many fields of fermentation industry when alcohol, yeast, citric acid, glutamic acid, lysine and various other fermentation products are produced. When a primary product is recovered from the fermentation broth, a dilute by-product solution remains. When this dilute by-product from fermentation is concentrated, it is generally called vinasse. It is also known as CMS (Condensed Molasses Solubles) and CPL (Complement Proteique Liquide). Conventionally, vinasse (often without concentration) has been disposed of as waste, used as a potassium fertilizer, and used as an additive in cattle feed. Vinasse has been used as cattle feed additive since it produces metabolizable energy at a low cost and also acts as a binder. The value of vinasse as a protein source has also been studied (Deleplanque, G. & Maindron, G., 1982, Le C. P. L. et la Pulpe Surpressee Ensilee, Secopal S. A.).

The high potassium content of vinasse may cause problems that appear e.g. as disorders in the magnesium absorption of the vinasse-receiving animal. Various methods have been developed in order to lower the potassium content (Lesaffre & Cie, FR 1,497,480, 1967; Beghin-Say, S. A., FR 2,573,088, 1986; Julsingba, J., NL 6,800,313, 1969; DE 1,817,550, 1970). These methods are based on precipitation of potassium either as salt or as double salt together with sulfate ions under essentially neutral conditions. Vinasse products with a reduced potassium content are sold under trademarks Prouvital, Proteinal, Sirional, Viprotal, etc.

It is also possible to recover valuable components from vinasse. One example is betaine, which can be recovered by chromatographic separation methods, as described in U.S. Pat. Nos. 4,359,430 and 5,127,957, Heikkilä et al. Betaine can also be recovered by using ion exchangers, which may be either cationic or anionic. Other valuable components that can be recovered include glycerol, monosaccharides, amino acids and succinic acid. The recovery of glycerol and glucose and the separation of amino acids are presented in Burris, B. D., 1986, Recovery of Chemicals such as Glycerol, Dextrose, and Aminoacids from Dilute Broths, International Conference on Fuel Alcohols and Chemicals from Biomass, Miami Beach, Fla. European Patent Application 0,411,780 A2, Kampen, describes the recovery of e.g. succinic acid, as well as that of betaine and glycerol. What remains after the recovery of these valuable components is another kind of vinasse having an enriched concentration of the remaining components.

Potassium can be removed from vinasse or from vinasse treated e.g. in the above manner by a novel and economic process, in which the pH of the vinasse is lowered by adding acid. The acid used is advantageously inorganic acid, such as hydrochloric acid or especially sulphuric acid, which precipitates the potassium as salt and/or double salt. The pH is usually adjusted to be below about 5.0, preferably about 3.0 to 3.8. The potassium salts formed are precipitated or crystallized in a controlled manner in an evaporative crystallizer and removed e.g. by filtration, decantation or centrifugation, or a combination of these methods. The remaining fraction has a high content of organic acids, which have been produced originally by the plant and/or in various chemical and/or microbiological processes used in the processing of plant extracts or molasses. The fraction is also called Bioacid in this application.

A similar organic acids containing fraction can also be produced from a residual product produced by extracting sugar from molasse either in part or in full. Processes of this kind are described in U.S. Pat. Nos. 4,359,430 and 5,127, 957, Heikkilä et al. The by-product concerned is called e.g. separator molasse, residual molasse, and C.S.B. (condensed separator by-product). If desired, betaine, monosaccharides, glycerol or other compounds can be removed from the separator molasse either in part or in full by methods known in the field, some of which are mentioned above. The composition of the fraction obtained from molasses differs somewhat from the fraction obtained from the vinasses: its sugar content is usually a little higher and organic acid content a little lower. This is partly due to the fact that the production of separator molasse does not include a fermentation stage. In the fermentation stage included in the production of vinasse, the microbes use part of the sugars and form e.g. an amount of organic acids therefrom. More particularly, it is pointed out that the organic acids containing fraction obtained from molasses usually comprises less lactic acid and succinic acid, which may form as a by-product in yeast fermentation.

Composition of the organic acids containing fraction

The original raw material is of plant origin. The composition of the plant material varies with the variety, soil, fertilizers, weather and other conditions. The methods used in the processing of the plant material also affect the composition of the intermediate. If the intermediate obtained is fermented, the fermentation process affects the composition of the fermentation product. Alternatively, if chromatographic treatment is carried out, the chromatography method used affects the composition of the product. In addition to these, it is possible to conduct various other operations, as described above. The composition of the organic acids containing fraction may thus vary considerably, and it is to be understood that the fraction used in the present invention may vary greatly in its composition. The essential feature in respect of the invention is that the fraction is acidic, has a high organic acid content and a low potassium content.

The raw material may consist, for example, of sugar beet, whose composition varies with the above-described parameters. The methods used in the processing of sugar beet affect the composition of the molasse obtained, and the further processing, the chromatography or fermentation process and the conditions used therein affect the composition of the product obtained. If desired, e.g. betaine or part of the betaine can be removed from the product. In addition, at least part of the potassium is removed therefrom. The organic acids containing fraction, Bioacid, recovered from this product is the final product, and its composition may clearly vary.

Typical compositions of some by-products obtained in sugar beet processing are shown in Table 1.

TABLE 1

Typical compositions of by-products obtained in sugar beet processing.
Results given as % of DM.

|  | Raw beet juice | Molasse | C.S.B. | Debetainized C.S.B. | Distillery vinasse | Yeast vinasse | Depotassified vinasse | Debetainized vinasse | Organic acids containing fraction |
|---|---|---|---|---|---|---|---|---|---|
| MONOSACCHARIDES | 1 | 0.2 | 0.5 | 0.6 | 0.6 | 0.6 | 0.6 | 0.2 | 0.2 |
| DISACCHARIDES | 87 | 60 | 18 | 22 | 1 | 1 | 1 | 1 | 1.2 |
| OTHER | 1.5 | 5 | 10 | 11 | 6 | 6 | 6 | 6 | 8 |

TABLE 1-continued

Typical compositions of by-products obtained in sugar beet processing.
Results given as % of DM.

| | Raw beet juice | Molasse | C.S.B. | Debetainized C.S.B. | Distillery vinasse | Yeast vinasse | Depotassified vinasse | Debetainized vinasse | Organic acids containing fraction |
|---|---|---|---|---|---|---|---|---|---|
| CARBOHYDRATES | | | | | | | | | |
| TOTAL NITROGEN | 0.5 | 1.8 | 4.5 | 5 | 5 | 4 | 10 | 4 | 6.5 |
| BETAINE | 1.4 | 5 | 12 | 1 | 15 | 18 | 19 | 2 | 2.4 |
| AMINO ACIDS | 1.6 | 2 | 5 | 6 | 6 | 2 | 3 | 6 | 7 |
| ORGANIC ACIDS | 2.5 | 4 | 10 | 15 | 18 | 20 | 22 | 30 | 36 |
| POTASSIUM | 1 | 6 | 12 | 13 | 12 | 14 | 4 | 15 | 4 |
| ASH | 2.1 | 12 | 24 | 26 | 24 | 28 | 15 | 30 | 15 |

Regardless of the starting material and the treatment, the organic acid content of the fraction is high, usually about 18 to 45%, preferably 30 to 45%, based on the dry matter. The major part of the organic acids consists of pyrrolidone carboxylic acid (PCA) and lactic acid, which are present in an amount of about 10 to 20%. In addition to these, the fraction may contain smaller amounts, usually less than 1%, of e.g. acetic acid, maleic acid, succinic acid, propionic acid and formic acid. The fraction also contains a relatively large quantity of nitrogen-containing substances: the total nitrogen content of the fraction is about 5 to 12%, and the amino acid content is about 1 to 10%. The total carbohydrate content is about 5 to 35%. The proportion of ash in the dry matter is about 12 to 30%. The betaine content varies between 1 and 20%, depending on the treatment.

The potassium content of the fraction can be adjusted to the desired level by controlling the amount of acid added. The usual potassium content is about 3.0 to 5.5%. The pH is acidic, usually less than about 5.0, preferably about 3.0 to 4.0.

Utilization of the organic acids containing fraction

The organic acids containing fraction has three particularly useful characteristics. The fraction is an acidic product that is very useful as a preservative. It is especially useful in the production of silage, either as such or together with suitable acid-resisting and acid-producing bacteria, such as lactic acid bacteria.

For example, the fraction obtained from vinasse may contain lactic acid (about 7 wt. %), acetic acid (about 1 wt. %) and PCA (about 10 wt. %). The pH of this acidic product is about 3 to 4, and when the product is added to forage, the pH value of the plant material drops and the life processes decrease in the same way as when conventional, highly acidic preservatives are used. The effect of the fraction, however, is weaker than that of strong acids, and so a greater dosage needs to be used to produce a pH response. Another alternative is to use the fraction together e.g. with lactic acid bacteria. A significant synergistic effect is then achieved, and the quantity of the fraction can be reduced. In both cases, the quality of the forage is significantly improved by the organic acids containing fraction.

When the fraction is used as the sole preservative in the preservation of forage, the suitable quantity is about 15 to 50 kg/tn.

When the fraction and the acid-resisting and acid-producing microbe are used together in the preservation of forage, the suitable quantity of the fraction is from about 4 kg/tn upwards.

It is also pointed out that the term 'forage' is here used in its general meaning. Forage may thus include e.g. hay, grass, corn, grain, or legume.

The organic acids containing fraction has also been observed to have a stimulating effect on the growth of various microbes. This is a useful characteristic in the production of silage, since the growth and activity of the desired microbes can be stimulated in the desired manner. This is also useful in view of other uses. The fraction can be used e.g. for stimulating the microbial growth in general, and different fermentation processes in particular. It has been observed, for example, that the fraction has a quite unexpected stimulating effect on the rumen fermentation processes. The fraction is thus also very useful as a substance enhancing forage utilization.

The third significant and surprising characteristic of the organic acids containing fraction is its pleasant taste and appetizing effect. Due to this, the fraction can be used as an additive of animal feed e.g. to improve the taste. Stimulating the appetite, it helps the animal to stay in good condition, and helps to increase the body weight or the production of a specified product, such as milk.

For example in dairy cattle, a low intake of dry matter (energy) is a great problem, particularly after calving when the energy demand is at its highest due to a great loss of energy through a rapid increase in milk production. The use of palatable ingredients, particularly in combination with propylene glycol, glycerol and similar substrates capable of affecting the fat metabolism by increasing the glucose content of blood, greatly helps in preventing the cow from falling into ketosis (acetonaemia). Antiketogenic substances, however, are not considered palatable, and so they must be force-fed to animals that even otherwise lack appetite. This is often the case when the cows are overweight and have been overfed during the dry-period before calving. Overfeeding before calving is a common problem in dairy farming all over the world, since the farmers try to adapt the cows to the shortage of energy that follows calving by giving them larger and larger quantities of concentrates before calving. This results in obesity, a fatty liver, lack of appetite, and a decrease in feed (energy) intake despite the rapidly increasing energy demand after calving.

Hence the energy intake affects milk production. Since the organic acids containing fraction increases feed intake, it enhances milk and meat production, and may thus become a key factor in dairy farming and animal husbandry.

The production, characteristics and uses of the organic acids containing fraction will be described in greater detail in the examples below. The examples are only intended to illustrate the invention, and they are not to be understood as restricting the scope of the invention. In the examples, the organic acids containing fraction is called Bioacid.

PREPARATION EXAMPLE I

After the fermentation stage of alcohol production, yeast was removed from the fermented mash through centrifugation. The mash was then conveyed to a distillation column, where the alcohol was removed. The column bottoms formed dilute vinasse, which still contained about 0.05 to 1.5% by volume of insoluble solids. The solids are typically formed of small yeast cells, other microbial cells, debris from broken cells, etc. The dry matter content of the liquid varied between 6.5 and 13 wt. %, and the potassium content between 10.7 and 11.7 wt. % based on the dry matter.

The solids-containing liquid was heated to about 85° to 95° C. The pH was adjusted to a value of about 6.5 to 7.0, and the liquid was clarified in a disc stack clarifier centrifuge (Westfalia SB7) at a rotational speed of 8500 rpm. The clarified vinasse was concentrated in an evaporator to a solids content of about 59 to 65% by using a forced-circulation evaporator (Rosenlew). Potassium sulphate crystals began to form at the solids content of about 40 wt. %.

The potassium sulphate crystals were removed as a slurry through decantation. The crystals sank to the bottom, and the relatively clear liquid was decanted from the top. Decantation based on gravity was used here. It is evident to one skilled in the art that it is also possible to use other methods and means, such as a centrifugal decanter, or filtration. The total amount of the separated potassium salt crystal slurry was 16% by volume.

The potassium salt crystals were recovered from the slurry with a filter press (Seitz Orion) comprising paper filter plates (Carlson). The crystals can also be recovered by means of other filters or, for example, a basket centrifuge having a perforated or a net-like screen.

The decanted liquid was also filtered with a filter press (Seitz Orion) using paper filter plates (Carlson) to remove the fine crystals and the remaining insoluble solids. A filter aid (Kenite 300) was also used. The filtration was very easy to perform, and the solids space of the filter was filled almost completely during the process.

The resultant clarified vinasse was then conveyed to a pilot scale chromatographic separator and separated into two fractions: a betaine fraction containing betaine, glycerol, inositol, monosaccharides and some amino acids, and a debetainized vinasse fraction which contained most of the ionizable material, the compounds with a high molecular weight, etc.

The vinasse fraction with a pH of about 6.9 and potassium level of about 14% based on the dry matter was concentrated to a dry matter content of about 59 to 61% by using a forced-circulation evaporator (Rosenlew). The evaporation was performed under vacuum at an absolute pressure of 120 to 200 mbar. Sulphuric acid (96%) was added slowly to the liquid in order to maintain a good crystal growth rate but to avoid the formation of new crystal nuclei. No neutralizing agent was added. The final pH of the liquid was about 3.1. At this point the slurry contained about 20 wt. % of crystals. The crystals were separated with a basket centrifuge having a perforated metal screen (Heine). The dry matter content of the crystal cake was 98%, of which potassium comprised 34%. The potassium content of the organic fraction was 4.9%, the organic acid content 30% and the amino acid content 4%.

PREPARATION EXAMPLE II

After the fermentation stage of yeast production, yeast was removed from the fermented mother liquor through centrifugation. The mother liquor was dilute vinasse which still contained about 0.01 to 0.8% by volume of insoluble solids. Solids are typically formed of small yeast cells, other microbial cells, debris from broken cells, etc. The dry matter content of the liquid varied between 3 to 7 wt. %, and the potassium content between 11.2 to 13.1% based on the dry matter.

The solids-containing liquid was heated to a temperature of about 85° to 95° C. The pH was then adjusted to a value of about 6.5 to 7.0, and the liquid was clarified with a high-efficiency clarifier centrifuge (disc stack clarifier centrifuge, Westfalia NA7) at a rotational speed of 8500 rpm. The clarified liquid typically contained about 0 to 0.05% of insoluble solids. The efficiency of insoluble solids removal was typically above 90%.

The clarified vinasse was concentrated in the manner described in Example I with similar results.

The potassium sulphate crystals were removed in the manner described in Example I.

The decanted vinasse was filtered in the manner described in Example I.

The vinasse pretreated in this manner was separated in a pilot scale chromatographic FSB-SMB separator in the manner described in Example I.

The debetainized vinasse fraction with a pH of about 7.5 was concentrated to a dry matter content of about 68 to 69% by using a forced-circulation evaporator (Rosenlew). Sulphuric acid (96%) was then added slowly to the liquid in order to maintain a good crystal growth rate but to avoid the formation of new crystal nuclei. No neutralizing agent was added. The final pH of the liquid was about 3.1. At this point the slurry contained about 20 wt. % of crystals. The crystals were separated with a basket centrifuge having a perforated metal screen (Heine). The dry matter content of the crystal cake was 97%, of which potassium comprised 32%. The potassium content of the organic fraction was 4.1%, the organic acid content 33%, and the amino acid content 2%.

PREPARATION EXAMPLE III

Beet molasse with a beet sugar content of 59%, betaine content of 5.5% and potassium content of 6.0%, based on the dry matter, was separated in an industrial chromatographic separation plant into three fractions:

1. a beet sugar fraction with a beet sugar content of 90 to 92% based on the dry matter,
2. a betaine fraction with a betaine content of about 45 to 50% based on the dry matter, and
3. a by-product fraction with a beet sugar content of about 22%, betaine content of about 0.7% and potassium content of about 13.9%, based on the dry matter.

The by-product with a pH of about 9.5 to 10 was concentrated to a dry matter content of about 70 to 73% using a multiple effect evaporator system; in the last stage, a forced-circulation evaporator (Rosenlew) was used. Sulfuric acid (96%) was added to the dilute liquid before evaporation. After the evaporation, the liquid had a pH of about 3.8. The slurry contained about 22 wt. % of crystals. The crystal slurry was removed by decantation. The decanter supernatant (organic fraction) and bottoms (crystal slurry) were filtered separately with a filter press (Seitz Orion) and Carlson filters. In the filtration of the supernatant, a filter aid (Kenite 300) was used. The crystal cake obtained in the filtration of the bottoms had a dry matter content of about 89%, 30% of which was potassium. The potassium content of the organic fraction was 3.9%, the organic acid content about 19%, and the amino acid content 1%.

PREPARATION EXAMPLE IV

Beet-based vinasse obtained in alcohol production and having a potassium content of about 12% based on the dry matter and a pH of about 5.6, was concentrated to a dry matter content of 59 to 61 wt. % using a forced-circulation evaporator (Rosenlew). The evaporation was conducted under vacuum at an absolute pressure of 120 to 200 mbar. Sulfuric acid (96%) was slowly added to the liquid until the final pH of the liquid was about 3.1. At this point the slurry contained about 18 wt. % of crystals. The crystals were removed with a basket centrifuge having a perforated metal screen (Heine). The crystal cake had a dry matter content of about 97%, about 32% of which was potassium. The potassium content of the organic fraction was about 5.2%, the organic acid content about 22%, and the amino acid content about 3%.

EXAMPLE 1
Preservation based on acidity of Bioacid

Timothy was harvested, cut into about 1-cm pieces, sprayed with desired additives and packed into laboratory scale silos. As a preservative were used different concentrations of Bioacid and a conventional amount of formic acid. The control was forage to which no preservative had been added. After three months, the silos were opened and the pH of the silage was determined by extracting a certain amount of silage into distilled water and by measuring the pH of the extract. The results, presented as an average of three parallel tests, are shown in Table 2. The results show that Bioacid affects the pH when used in an amount of more than about 16 l/tn. When 32 l/tn were used, the silage pH was 4.8, i.e. at approximately the same level as with strong formic acid.

TABLE 2

Effect of Bioacid on silage pH

| Treatment | pH, average of 3 silos |
| --- | --- |
| Control | 5.5 |
| Formic acid, 4 l/tn | 4.5 |
| Bioacid, 8 l/tn | 5.7 |
| Bioacid, 16 l/tn | 5.5 |
| Bioacid, 32 l/tn | 4.8 |

EXAMPLE 2
Preservation based on acidity of Bioacid

When the ensiling conditions are poor, the forage is spoiled by undesired micro-organisms that produce extensive gas. Part of the silage dry matter is then lost as gas, which makes ensiling less economic. The effect of Bioacid on the dry matter loss of the forage during preservation is analyzed by measuring gas production. At the beginning of the preservation, samples were taken daily, and later, when gas production slowed down, samples were taken less often. The forage in this test comprised timothy and ryegrass, to which different concentrations of Bioacid were added. The results are shown in Table 3.

TABLE 3

Effect of Bioacid on dry matter loss of silage

| | Dry matter loss (%) | |
| --- | --- | --- |
| Treatment | Timothy | Ryegrass |
| Control | 4.3 | 5.8 |
|  | 4.6 | 6.2 |
|  | 4.6 | 6.6 |
| Bioacid 8 l/tn | 4 | 3.6 |
|  | 3.8 | 2.8 |

TABLE 3-continued

Effect of Bioacid on dry matter loss of silage

| | Dry matter loss (%) | |
| --- | --- | --- |
| Treatment | Timothy | Ryegrass |
|  | 4.1 | 2.7 |
| Bioacid 16 l/tn | 2.5 | 1.6 |
|  | 2.3 | 1.5 |
|  | 2.4 | 1.4 |

The results show that Bioacid clearly reduced the dry matter loss even when used in an amount of only 8 l/tn, both with timothy and ryegrass. When Bioacid was used in an amount of 16 l/tn, the dry matter loss was reduced by half with timothy and by three quarters with ryegrass.

EXAMPLE 3
Preservation-based on stimulation of lactic acid bacteria

Bioacid was also observed to have a stimulating effect on the growth of lactic acid bacteria. If the forage used contains suitable lactic acid bacteria, no microbes need to be added to produce high-quality silage, and yet the dry matter losses stay small. The number of useful microbes, however, may be too small, whereby the growth of harmful microbes may be stimulated by Bioacid, and this may lead to spoilage of silage. To guarantee the presence of effective lactic acid bacteria, suitable bacteria, which preferably have been adapted to Bioacid, can be added to the forage.

The suitability of different lactic acid bacteria can be checked by growing them in the presence and absence of Bioacid. In the invention there was used e.g. a medium that comprised a grass extract, 1% of glucose, 1% of xylose and optionally 1% of Bioacid. The growth was analyzed by measuring the absorbance at 600 nm after a 24-hour incubation at a temperature of 28° C. The stimulating effect of vinasse-based Bioacid on some commercially available lactic acid bacterial strains is shown in Table 4. The corresponding data on molasse-based Bioacid are shown in Table 5.

TABLE 4

Effect of vinasse-based Bioacid on growth of lactic acid bacteria.

| Lactic acid bacterium | Growth with Bioacid $A_{600\ nm}$ | Growth without Bioacid $A_{600\ nm}$ | +BA/−BA |
| --- | --- | --- | --- |
| Rod-shaped bacteria Isolated from: | | | |
| SSV Bio 2 (*Lactobacillus plantarum*) | 0.55 | 0.40 | 1.4 |
| Nutrimix (*L. plantarum*) | 0.49 | 0.38 | 1.3 |
| Axphast Gold (*L. plantarum*) | 0.50 | 0.41 | 1.2 |
| Valio (*L. plantarum*) | 0.41 | 0.37 | 1.1 |
| Genus (*L. plantarum*) | 0.29 | 0.36 | 0.8 |
| Cocci bacteria Isolated from: | | | |
| Nutrimix (*Pediococcus acidilactidi*) | 0.35 | 0.31 | 1.1 |
| SSV Bio 2 (*Pediococcus pentosaceus*) | 0.30 | 0.28 | 1.1 |
| Nutrimix (*Streptococcus faecium*) | 0.20 | 0.23 | 0.9 |
| SIL-ALL (unknown) | 0.20 | 0.27 | 0.7 |

BA = Bioacid

TABLE 5

Effect of molasse-based Bioacid on growth of lactic acid bacteria

| Lactic acid bacterium | Growth with Bioacid $A_{600\ nm}$ | Growth without Bioacid $A_{600\ nm}$ | +BA/−BA |
|---|---|---|---|
| Rod-shaped bacteria Isolated from: | | | |
| SSV Bio 2 (*Lactobacillus plantarum*) | 0.51 | 0.36 | 1.4 |
| SIL-ALL (unknown) | 0.14 | 0.33 | 0.4 |
| Pioneer (*L. plantarum*) | 0.40 | 0.34 | 1.2 |
| Ecosyl (*L. plantarum*) | 0.24 | 0.24 | 1.0 |
| Axphast Gold (*L. plantarum*) | 0.54 | 0.36 | 1.5 |
| Genus (*L. plantarum*) | 0.39 | 0.33 | 1.2 |
| Cocci bacteria Isolated from: | | | |
| Solo (*Pediococcus pentosaceus*) | 0.39 | 0.24 | 1.6 |
| SSV Bio 2 (*P. pentosaceus*) | 0.29 | 0.23 | 1.3 |
| Forager (unknown) | 0.02 | 0.34 | 0.1 |
| Diamond (unknown) | 0.28 | 0.22 | 1.3 |

BA = Bioacid

EXAMPLE 4

Preservation based on stimulation of lactic acid bacteria

Timothy and ryegrass silage were produced by adding Bioacid or lactic acid bacteria (SSV Bio 2 *L. plantarum* and *P. pentosaceus*) or both. The silage pH was determined on the first eight days of the preservation. The addition of lactic acid bacteria had a notable effect on pH kinetics, whereas Bioacid in the amount added to forage in this test did not significantly speed the drop of pH. The acid addition, however, reduced the dry matter loss both with timothy and ryegrass. The results on pH kinetics are shown in Tables 6 and 7, and on gas production in Table 8.

TABLE 6

Effect of Bioacid on pH kinetics of timothy silage

| Treatment | 1 day | 3 days | 8 days |
|---|---|---|---|
| Control | 5.7 | 4.5 | 4.3 |
| - " - + lactic acid bacteria, level I | 4.7 | 4.0 | 4.0 |
| - " - + lactic acid bacteria, level II | 4.4 | 4.0 | 3.9 |
| Bioacid, 8 1/tn | 5.7 | 4.7 | 4.3 |
| - " - + lactic acid bacteria, level I | 4.6 | 4.1 | 4.0 |
| - " - + lactic acid bacteria, level II | 4.4 | 4.0 | 3.9 |
| Bioacid, 16 1/tn | 5.4 | 4.7 | 4.3 |
| - " - + lactic acid bacteria; level I | 4.7 | 4.1 | 4.0 |
| - " - + lactic acid bacteria, level II | 4.6 | 4.0 | 3.9 |
| Formic acid, 4 1/tn | 4.5 | 4.5 | 4.5 |
| - " - + lactic acid bacteria, level I | 4.5 | 4.5 | 4.6 |
| - " - + lactic acid bacteria, level II | 4.5 | 4.6 | 4.6 |

TABLE 7

Effect of Bioacid on pH kinetics of ryegrass silage

| Treatment | 1 day | 4 days | 8 days |
|---|---|---|---|
| Control | 6.1 | 5.3 | 5.6 |
| - " - + lactic acid bacteria, level I | 4.5 | 4.0 | 4.0 |
| - " - + lactic acid bacteria, level II | 4.5 | 4.0 | 4.0 |
| Bioacid, 8 1/tn | 6.1 | 5.4 | 5.1 |
| - " - + lactic acid bacteria, level I | 4.7 | 4.0 | 4.0 |
| - " - + lactic acid bacteria, level II | 4.3 | 4.0 | 4.0 |
| Bioacid, 16 1/tn | 5.5 | 5.1 | 4.3 |
| - " - + lactic acid bacteria, level I | 4.6 | 4.0 | 4.0 |
| - " - + lactic acid bacteria, level II | 4.4 | 4.0 | 4.0 |
| Formic acid, 4 1/tn | 4.3 | 4.3 | 4.2 |
| - " - + lactic acid bacteria, level I | 4.6 | 4.6 | 4.7 |
| - " - + lactic acid bacteria, level II | 4.6 | 4.6 | 4.6 |

TABLE 8

Effect of Bioacid on gas production in forage preservation

| Treatment | Total gas production (ml/g of DM) | |
|---|---|---|
| | Timothy | Ryegrass |
| Control | 25 | 33 |
| Lactic acid bacteria, level II | 14 | 10 |
| Bioacid, 8 1/tn | 21 | 15 |
| Bioacid, 16 1/tn | 13 | 8 |
| Bioacid, 8 1/tn + lactic acid bacteria, level II | 11 | 7 |
| Bioacid, 16 1/tn + lactic acid bacteria, level II | 6 | 6 |

Lactic acid bacteria, level I = $10^5$ lactic acid bacteria per one gram of fresh grass
Lactic acid bacteria, level II = $10^6$ lactic acid bacteria per one gram of fresh grass The results show it clearly that Bioacid is a very effective preservative both as such when used in a relatively large amount, and even in a smaller amount when used together with suitable lactic acid bacteria.

EXAMPLE 5

Stimulation of rumen fermentation processes

In vivo digestibility and utilization of feed in ruminants are usually assessed on the basis of gas production in vitro (Khazaal et al., 1993, Anim. Prod. 57, 105–112). The gas production brought about by Bioacid was analyzed in the following manner.

Eleven samples of silage treated with formic acid (4 1/tn), each of which contained 1 g of dry matter, were incubated under strictly anaerobic conditions in rumen liquor for 24 hours (rumen simulation method, Van Soest, P., Forage fiber analysis, Agricultural Handbook No. 379, Agricultural Research Service, United States Dept. of Agriculture, 1975). To three of the above samples, each of which contained 24% of dry matter, was mixed 16 1/tn of Bioacid before incubation. The dry matter content of Bioacid was 60%, so Dioacid raised the dry matter content of the latter samples by 4% (0.04 g). The gas production was measured with a syringe. The results are shown in Table 9.

TABLE 9

Effect of Bioacid on gas production in rumen simulation

| Gas production in rumen simulation | 24 hours | 48 hours | Total |
|---|---|---|---|
| Formic acid silage (n = 8) | 122.4 | 61.3 | 183.7 |
| - " - + 16 1/tn Bioacid (n = 3) | 136.7 +12% | 55.7 -9% | 192.4 +4.7% |

Bioacid significantly increased gas production in vitro in 24 hours. The 12% growth shown in Table 9 is probably due to either increased microbial activity or microbe selection rather than the additional substrate as such, since the addition of Bioacid as dry matter was only 0.04 g per 1 g of silage dry matter.

In this test, the microbial activity measured by gas production increased during the first 24 hours and then decreased during the next 24 hours. This may indicate that the available organic matter present in the silage dry matter is utilized more quickly, i.e. the feed is digested faster. The faster the feed is digested, the more the animal usually eats, which in turn leads to an increase in the energy intake and the performance. This is economically important e.g. in view of ruminant production.

EXAMPLE 6
Palatability and stimulation of appetite

Grass was cut and stored in a cold place (+4° C.) overnight. On the following day the grass temperature was allowed to rise to room temperature (+18° C.), 8 l/tn of Bioacid was added, and the mixture was stirred. It was then offered to ten randomly selected (dairy) cows that also had a free access to fresh, newly-cut grass. Surprisingly, all the ten cows immediately started eating the one-day old grass treated with Bioacid. This is quite extraordinary, since normally 2 or 3 cows out of 10 do not like or refuse to eat new feed, especially when fresh grass is available. Bioacid thus has a remarkable taste-improving effect.

EXAMPLE 7

Silage was here administered to a rumen in vitro simulation system either as such or supplemented with Bioacid. The rumen buffer was modified on the basis of the van Soest method (Forage fiber analysis, Agricultural Handbook No. 379, Agricultural Research Service, United States Dept. of Agriculture, 1975) by doubling the amount of phosphate buffer. An anaerobic, reduced buffer solution was added to anaerobic silage-containing serum bottles, using 33 ml of the buffer solution per 1 g of silage dry matter. The sealed bottles were incubated at 38° C., after which 7 ml of homogenized rumen contents were added per 1 g of silage dry matter. The cultures were stirred carefully for 15 minutes in every two hours. The parameters measured in the tests were gas production, VFA content, i.e. amount of volatile fatty acids, and microbe-based biomass. Microbe-based biomass is the major source of protein to ruminants, whereas VFA is the major source of energy.

Gas production was analyzed by measuring the amount of gas produced in 24 hours with a syringe. The volatile fatty acid (VFA) quantity was measured after 48 hours by capillary electrophoresis of the culture filtrate.

The biomass was analyzed by a purine method in the following manner. Rumen cultures containing 0.9 g of timothy silage or 0.7 g of ryegrass silage, based on the dry matter, were centrifuged to concentrate the biomass produced, the pellet was washed with water and dried under air flow at 40° C. To the dried residue was added 5 ml of 70% perchloric acid and glass beads, it was shaken at 37° C. for 60 minutes and incubated at 95° C. for 60 minutes. The pellets were broken, 35 ml of 0.0285M $NH_4H_2PO_4$ was added, the bottles were shaken, and incubation was again carried out at 95° C. for 15 minutes. The extracts were filtered through a Whatman 41 filter, and the filtrate was centrifuged at a rotational speed of 10000 rpm (rotor ss-34) for 30 minutes. Fifty (50) µl of the filtrate was mixed with 500 µl of 0.4M $AgNO_3$ and 9 ml of 0.2M $NH_4H_2PO_4$ in a glass centrifuge tube. A purine precipitate was formed, and it was allowed to develop overnight at above +4° C. The mixtures were then centrifuged for 40 minutes at a speed of 10 000 rpm (rotor ss-34). Supernatants were removed, and the pellets were washed with 10 ml of diluted $H_2SO_4$, pH 2. The precipitates were then dissolved in 10 ml of 0.5N HCl by incubating at 95° C. for 30 minutes. Under these conditions, purine was dissolved and AgCl was precipitated. The absorbance of the clarified supernatant was measured at 260 nm. The pure bacterial cultures were analyzed for purine in the same manner, and for nitrogen by the Kjeldahl method, to obtain a coefficient for converting the purine into microbial nitrogen and dry matter.

The results obtained are shown in Tables 10, 11 and 12.

TABLE 10

Effect of Bioacid of gas production in rumen in vitro simulation

| | Gas production in 24 hours (ml/g of DM) | |
|---|---|---|
| Treatment | Timothy | Ryegrass |
| Control | 233 | 203 |
| Bioacid, 8 1/tn | 238 | 209 |
| Bioacid, 16 1/tn | 240 | 214 |
| Bioacid, 8 1/tn + lactic acid bacteria, level II | 244 | 222 |
| Bioacid, 16 1/tn + lactic acid bacteria, level II | 244 | 218 |
| Formic acid, 4 1/tn | 258 | 253 |

Lactic acid bacteria, level II = $10^b$ lactic acid bacteria per one gram of fresh grass

TABLE 11

Effect of Bioacid on VFA content in rumen in vitro simulation

| | Total VFA content after 48 hours (mmol/g of DM) | |
|---|---|---|
| Treatment | Timothy | Ryegrass |
| Control | 7.65 | 7.27 |
| Bioacid, 8 1/tn | 8.53 | 8.01 |
| Bioacid, 16 1/tn | 8.32 | 7.36 |
| Formic acid, 4 1/tn | 7.64 | 7.19 |

TABLE 12

Effect of Bioacid on microbial mass in rumen

| Treatment | Microbial mass in rumen (mg/g of DM) | |
| --- | --- | --- |
| | Timothy | Ryegrass |
| Control | 74 | 59 |
| Bioacid, 8 1/tn | 76 | 63 |
| Bioacid, 16 1/tn | 77 | 66 |
| Bioacid, 8 1/tn + lactic acid bacteria, level II | 77 | 65 |
| Bioacid, 16 1/tn + lactic acid bacteria, level II | 79 | 68 |

Lactic acid bacteria, level II = $10^b$ lactic acid bacteria per one gram of fresh grass It is of major significance that the Bioacid treated silage produced up to 10% more VFA than the formic acid treated silage. This is due to the general stimulating effect that Bioacid has on microbial fermentation, and to the low gas production in rumen fermentation. The positive effect is even more valuable when it is taken into account that, measured as dry matter per 1 kg of fresh forage, more silage was produced with Bioacid than with the known silage additives. In all concentrations tested, Bioacid also increased the yield of microbe-based biomass.

We claim:

1. An organic acids containing fraction obtained from molasses or vinasses, characterized in that it is acidic, contains organic acids and has a lower potassium content than said molasses or vinasses.

2. An organic acids containing fraction according to claim 1 prepared by lowering the pH of separator molasses or vinasses by adding acid, whereby a precipitate is formed, and removing said precipitate.

3. A method of preserving forage, comprising adding to forage a fraction obtained from molasses or vinasses, which fraction contains organic acids.

4. The method of claim 3 further comprising adding lactic acid bacteria to said forage.

5. The method of claim 3 or 4 wherein the addition of said fraction to said forage is effective to stimulate microbial activity in said forage.

6. The method of claim 3 or 4 wherein the addition of said fraction to said forage is effective to improve the taste of said forage.

7. A method of enhancing forage utilization, comprising adding to forage a fraction obtained from molasses or vinasses, which fraction contains organic acids.

8. The method of claim 7 further comprising adding lactic acid bacteria to said forage.

9. The method of claim 7 or 8 wherein the addition of said fraction to said forage is effective to stimulate microbial activity in said forage.

10. The method of claim 7 or 8 wherein the addition of said fraction to said forage is effective to improve the taste of said forage.

* * * * *